United States Patent
Chen et al.

(10) Patent No.: US 11,255,975 B2
(45) Date of Patent: Feb. 22, 2022

(54) SYSTEMS AND METHODS FOR IMPLEMENTING A TRACKING CAMERA SYSTEM ONBOARD AN AUTONOMOUS VEHICLE

(71) Applicant: Pony AI Inc., Grand Cayman (KY)

(72) Inventors: Kai Chen, San Jose, CA (US); Tiancheng Lou, Milpitas, CA (US); Jun Peng, Fremont, CA (US); Xiang Yu, Santa Clara, CA (US); Zhuo Zhang, Fremont, CA (US); Yiming Liu, San Jose, CA (US); Hao Song, Sunnyvale, CA (US)

(73) Assignee: Pony AI Inc., Grand Cayman (KY)

( * ) Notice: Subject to any disclaimer, the term of this patent is extended or adjusted under 35 U.S.C. 154(b) by 790 days.

(21) Appl. No.: 16/000,414

(22) Filed: Jun. 5, 2018

(65) Prior Publication Data
US 2019/0369241 A1     Dec. 5, 2019

(51) Int. Cl.
| | |
|---|---|
| *G01S 17/931* | (2020.01) |
| *G01S 17/66* | (2006.01) |
| *G01S 17/86* | (2020.01) |
| *G03B 13/20* | (2021.01) |
| *G02B 7/40* | (2021.01) |
| *G02B 7/28* | (2021.01) |

(52) U.S. Cl.
CPC ............ *G01S 17/931* (2020.01); *G01S 17/66* (2013.01); *G01S 17/86* (2020.01); *G02B 7/287* (2013.01); *G02B 7/40* (2013.01); *G03B 13/20* (2013.01); *B60W 2420/42* (2013.01); *B60W 2554/4048* (2020.02)

(58) Field of Classification Search
CPC ....... B60W 2420/42; B60W 2554/4048; G01S 17/66; G01S 17/86; G01S 17/931; G02B 7/287; G02B 7/40; G03B 13/20
See application file for complete search history.

(56) References Cited

U.S. PATENT DOCUMENTS

| | | |
|---|---|---|
| 5,111,401 A | 5/1992 | Everett, Jr. et al. |
| 5,157,432 A * | 10/1992 | Fukuoka .................. G02B 7/34 396/81 |
| 6,685,148 B2 | 2/2004 | Zadok |
| 6,776,488 B2 | 8/2004 | Burbulla |
| 7,178,997 B2 | 2/2007 | Claudi |

(Continued)

*Primary Examiner* — Behrang Badii
*Assistant Examiner* — Daniel L Greene
(74) *Attorney, Agent, or Firm* — Sheppard Mullin Richter & Hampton LLP

(57) ABSTRACT

Systems, methods, and non-transitory computer-readable media are provided for implementing a tracking camera system onboard an autonomous vehicle. Coordinate data of an object can be received. The tracking camera system actuates, based on the coordinate data, to a position such that the object is in view of the tracking camera system. Vehicle operation data of the autonomous vehicle can be received. The position of the tracking camera system can be adjusted, based on the vehicle operation data, such that the object remains in view of the tracking camera system while the autonomous vehicle is in motion. A focus of the tracking camera system can be adjusted to bring the object in focus. The tracking camera system captures image data corresponding to the object.

20 Claims, 7 Drawing Sheets

(56) References Cited

U.S. PATENT DOCUMENTS

| | | | |
|---|---|---|---|
| 8,272,053 B2* | 9/2012 | Markham | G08B 29/188 |
| | | | 726/23 |
| 9,934,689 B2 | 4/2018 | Prokhorov | |
| 2016/0031559 A1* | 2/2016 | Zang | B64D 47/08 |
| | | | 701/2 |
| 2018/0060725 A1* | 3/2018 | Groh | G06N 3/08 |
| 2018/0203124 A1* | 7/2018 | Izzat | G01S 17/86 |
| 2019/0120948 A1* | 4/2019 | Yang | G01C 21/165 |
| 2019/0158740 A1 | 5/2019 | Rogers et al. | |

* cited by examiner

FRONTAL VIEW

SIDE VIEW

FRONTAL VIEW

SIDE VIEW

SYSTEMS AND METHODS FOR IMPLEMENTING A TRACKING CAMERA SYSTEM ONBOARD AN AUTONOMOUS VEHICLE

FIELD OF THE INVENTION

This disclosure relates to implementing a camera system onboard an autonomous vehicle. More particularly, this disclosure relates to techniques for implementing a tracking camera system onboard the autonomous vehicle.

BACKGROUND

In general, self-driving vehicles, assisted-driving vehicles, and/or autonomous vehicles refer to a category of vehicles that can be operated with limited or no human interactions. These vehicles rely on acquiring road information from various sensors and/or devices onboard to make driving decisions. In particular, autonomous vehicles predominately rely on light detection and ranging sensors (LiDARs) to monitor an environment. The autonomous vehicles can utilize the LiDARs to quickly detect, identify, and track objects (e.g., pedestrians, cyclists, other moving vehicles, traffic lights, etc.) in the environment. For example, a LiDAR can detect, identify, and differentiate a pedestrian from a cyclist. In some instances, the LiDAR can determine a speed and a direction (e.g., track) at which the pedestrian is walking and/or the cyclist is cycling. Generally, LiDARs can identify objects up to some threshold distance. Beyond this threshold distance, the LiDARs' ability to accurately identify objects diminishes.

SUMMARY

Various embodiments of the present disclosure can include systems, methods, and non-transitory computer readable media configured to implement a tracking camera system onboard an autonomous vehicle. Coordinates of an object can be received. The tracking camera system actuates, based on the coordinate data, to a position such that the object is in view of the tracking camera system. Vehicle operation data of the autonomous vehicle can be received. The position of the tracking camera system can be adjusted, based on the vehicle operation data, such that the object remains in view of the tracking camera system while the autonomous vehicle is in motion. A focus of the tracking camera system can be adjusted to bring the object in focus. The tracking camera system captures image data corresponding to the object.

In some embodiments, the image data can be analyzed, based on one or more object identification and recognition algorithms, to identify the object. A confidence score associated with the identified object can be determined.

In some embodiments, the object is located beyond a threshold distance for which a LiDAR no longer accurately identifies the object.

In some embodiments, the coordinate data comprise azimuth data and elevation data corresponding to a location of the object.

In some embodiments, the azimuth data corresponding to the location of the object is determined from a rotation and point cloud data of the LiDAR.

In some embodiments, the elevation data corresponding to the location of the object is determined from point cloud data of the LiDAR.

In some embodiments, the tracking camera system can be rotated to an azimuth position corresponding to the coordinate data. The tracking camera system can be pivoted to an elevation position corresponding to the coordinate data.

In some embodiments, the vehicle operation data comprises at least a speed and a direction of the autonomous vehicle.

In some embodiments, the tracking camera system can be continuously rotated, in azimuth, to account for a vehicle speed and a vehicle direction. The tracking camera system can be continuously pivoted, in elevation, to account for the vehicle speed and the vehicle direction.

In some embodiments, a phase difference between the object and the tracking camera system can be determined. One or more lenses in an optical system of the tracking camera can be actuated, based on the phase difference, to bring the object in focus.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

Figure 1:
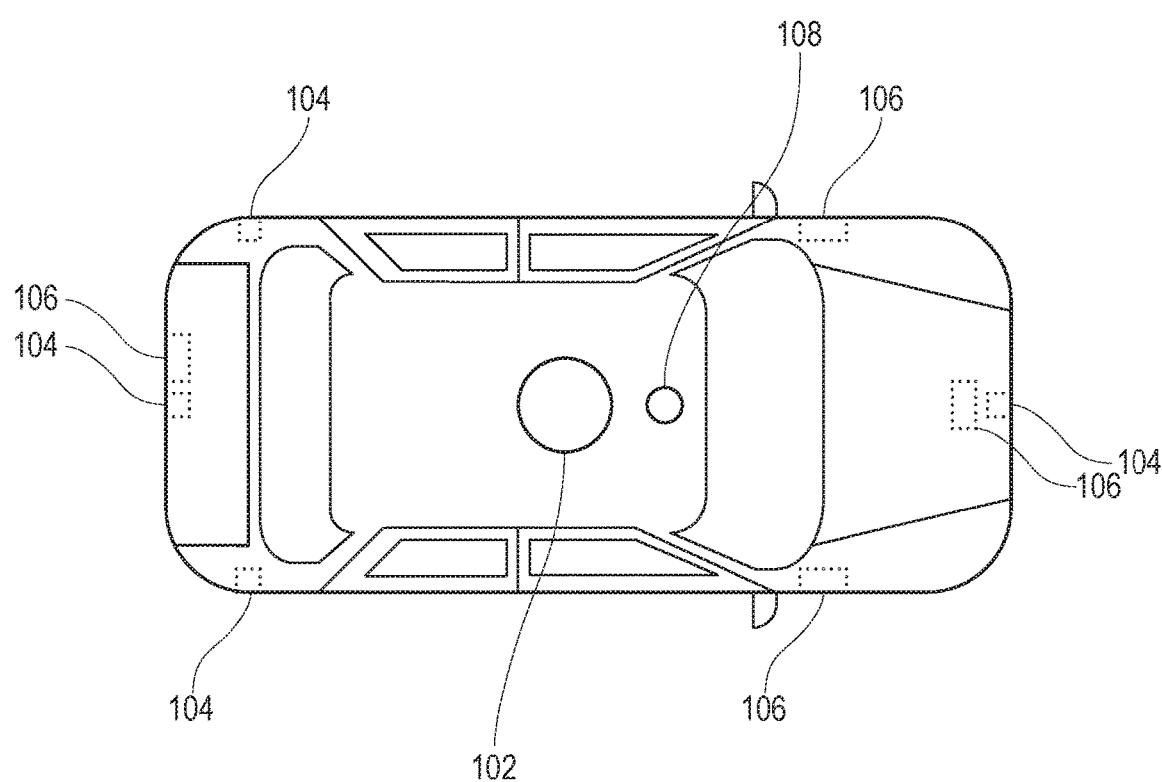
FIG. 1 illustrates an example autonomous vehicle, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Autonomous vehicles rely on various sensors and/or devices to acquire road information. Road information is processed in real time, or near real time, so the autonomous vehicles can make real time driving decisions in response to ever changing road conditions. For an autonomous vehicle to operate as efficiently and as safely as it possibly can, the autonomous vehicle must be able to detect, identify, and track objects (e.g., pedestrians, cyclists, other moving vehicles, etc.) in an environment as far out and as early as possible. For example, an autonomous vehicle, driving at 20 meters per second (approximately 44 miles per hour), detects and identifies a child at an intersection at 80 meters away (approximately 262 feet). In this example, the autonomous vehicle has at most 4 seconds to react. This time might or might not be sufficient for the autonomous vehicle to react in a safe manner without disturbing or disrupting passengers of the autonomous vehicle (e.g., making an emergency stop). In contrast, if the autonomous vehicle were to detect and identify the child at 160 meters away, the autonomous vehicle has twice as much time (8 seconds) to react to the child. The autonomous vehicle, in this case, has ample time to slow down without causing discomfort to its passengers.

Under conventional approaches, distances at which objects can be detected, identified, and tracked by an autonomous vehicle may be limited by hardware onboard the autonomous vehicle. For example, generally, light detection and ranging sensors (LiDARs) can identify objects in an environment up to some threshold distance. Within this threshold distance, LiDARs are capable of accurately detecting, identifying, and tracking objects. For instance, a LiDAR can accurately identify and differentiate a pedestrian from a cyclist if the pedestrian and the cyclist are within the threshold distance. For objects that are located outside the threshold distance, the LiDAR might still be able to detect and track the objects, but the LiDAR's ability to accurately identify the objects decreases, thereby, reducing time available to the autonomous vehicle to react or respond. As such, conventional approaches to using LiDARs to detect, identify, and track objects beyond a certain distance can be ineffective and more importantly, inaccurate.

A claimed solution rooted in computer technology overcomes problems specifically arising in the realm of computer technology. In various embodiments, systems, methods, and non-transitory computer readable media can be configured to implement a tracking camera system onboard an autonomous vehicle to augment a LiDAR. The tracking camera can be utilized in situations where the LiDAR can no longer accurately identify objects in an environment. In various embodiments, coordinates of an object can be received. The tracking camera system actuates, based on the coordinate data, to a position such that the object is in view of the tracking camera system. Vehicle operation data of the autonomous vehicle can be received. The position of the tracking camera system can be adjusted, based on the vehicle operation data, such that the object remains in view of the tracking camera system while the autonomous vehicle is in motion. A focus of the tracking camera system can be adjusted to bring the object in focus. The tracking camera system captures image data corresponding to the object.

In various embodiments, autonomous vehicles may navigate through roads, streets, and/or terrains with limited or no human input. The word "vehicle" or "vehicles" as used in this specification includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein.

In general, an autonomous vehicle can effectuate any control to itself that a human driver can on a conventional vehicle. For example, the autonomous vehicle can accelerate, brake, turn left or right, or drive in a reverse direction just as the human driver can on the conventional vehicle. The autonomous vehicle can also sense environmental conditions, gauge spatial relationships (e.g., distances between objects and itself), detect and analyze road signs just as the human driver. Moreover, the autonomous vehicle can perform more complex operations, such as parallel parking, parking in a crowded parking lot, collision avoidance, etc., without any human input.

FIG. 1 illustrates an example autonomous vehicle 100, according to an embodiment of the present disclosure. The autonomous vehicle 100 can include a myriad of sensors (e.g., LiDARs, radars, cameras, etc.) to detect, identify, and track objects in an environment. Such objects may include pedestrians, road signs, traffic lights, for example. The autonomous vehicle 100 can also include a myriad of actuators to help the autonomous vehicle 100 navigate around the environment in response to the objects. Such actuators may include, for example, electro or electromechanical devices and/or systems to control throttle responses, brake actions, steering actions of the autonomous vehicle 100. In some embodiments, the autonomous vehicle 100 can recognize, interpret, or decipher road signs (e.g., speed limit, school zone, construction zone, etc.) and traffic lights (e.g., red light, yellow light, green light, flashing red light, etc.). For example, the autonomous vehicle 100 can adjust its speed in accordance with speed limit signs posted on roadways. In some embodiments, the autonomous vehicle 100 can determine and adjust speeds at which the autonomous vehicle 100 is traveling relative to other objects in the environment. For example, the autonomous vehicle 100 can maintain a constant, safe distance from a vehicle ahead (e.g., adaptive cruise control). In this example, the autonomous vehicle 100 maintains this safe distance by constantly adjusting its vehicle speed to that of the vehicle ahead.

In various embodiments, the autonomous vehicle 100 may include one or more sensors. As used herein, the one or more sensors may include a LiDAR 102, radars 104, general purpose cameras 106, a tracking camera system 108, and/or the like. The one or more sensors allow the autonomous vehicle 100 to sense an environment around the autonomous vehicle 100. For example, the LiDAR 102 can generate three dimensional maps of the environment. The LiDAR 102 can detect, identify, and track objects in the environment. The radars 104 can determine relative distances and speeds of objects around the autonomous vehicle 100. The general purpose cameras 106 can capture and process image data to detect and identify objects, such as road signs, as well as interpreting or deciphering content of the objects, such as speed limits posted on the road signs. The tracking camera system 108 can be configured to augment the LiDAR in identifying objects when the objects are afar. As discussed, the LiDAR's ability in identifying objects diminishes as distances between the LiDAR 108 and the objects are increased. In such instances, the tracking camera system 108 can be used, in conjunction with or in lieu of the LiDAR 102, to identify the objects. The tracking camera system 108 is discussed in further detail with respect to FIG. 2A and FIG. 2B herein.

In the example of FIG. 1, the autonomous vehicle 100 is shown with a LiDAR 102. The LiDAR 102 is coupled to a roof or a top of the autonomous vehicle 100. As discussed, LiDAR 102 can be configured to generate three dimensional maps of an environment. In some instances, the LiDAR 102 can also be configured to detect, identify, and track objects in the environment. In the example of FIG. 1, the autonomous vehicle 100 is shown with four radars 104. Two radars are coupled to a front-side and a back-side of the autonomous vehicle 100, and two radars are coupled to a right-side and a left-side of the autonomous vehicle 100. In some embodiments, the front-side and the back-side radars can be configured for adaptive cruise control and/or accident avoidance. For example, the front-side radar can be used by the autonomous vehicle 100 to maintain a healthy distance from a vehicle ahead of the autonomous vehicle 100. In another example, if the vehicle ahead experiences a sudden reduction in speed, the autonomous vehicle 100 can detect this sudden change and adjust its vehicle speed accordingly. In some embodiments, the right-side and the left-side radars can be configured for blind-spot detection. In the example of FIG. 1, the autonomous vehicle 100 is shown with four general purpose cameras 106. Two cameras are coupled to the front-side and the back-side of the autonomous vehicle 100, and two cameras are coupled to the right-side and the left-side of the autonomous vehicle 100. In some embodiments, the front-side and the back-side cameras can be configured to detect objects, such as cars, trucks, sports utility vehicles, pedestrian, road signs, in the front and the back of the autonomous vehicle 100. For example, the front-side camera can be utilized by the autonomous vehicle 100 to determine speed limits. In some embodiments, the right-side and the left-side cameras can be configured to detect objects, such as lane markers, on the sides of the autonomous vehicle 100. For example, the right-side and the left-side cameras can be used by the autonomous vehicle 100 to ensure that the autonomous vehicle 100 drives within its lane. In the example of FIG. 1, the autonomous vehicle 100 is shown with a tracking camera system 108. The tracking camera system 108 is coupled to the roof or the top of the autonomous vehicle 100. In some embodiments, the tracking camera system 108 can be configured to augment the LiDAR 102 in identifying objects that are afar and for which the LiDAR 102 is not able to accurately identify the objects. Although in the embodiment depicted in FIG. 1, the autonomous vehicle 100 is shown with only one tracking camera system, the autonomous vehicle 100 can have more than one tracking camera system. For example, in some embodiments, the autonomous vehicle 100 can have two tracking camera systems. Many variations are possible.

Figure 2A:
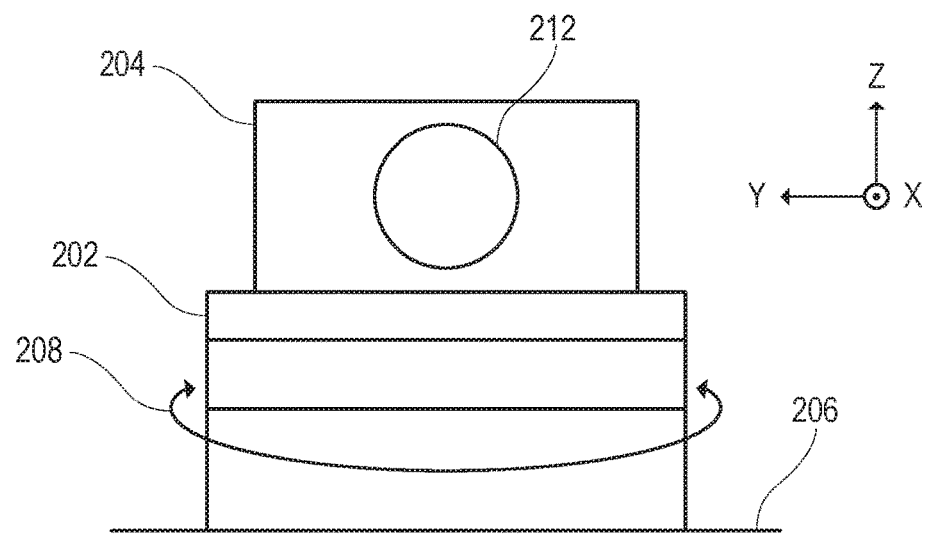
FIG. 2A illustrates an example tracking camera system, according to an embodiment of the present disclosure.
Figure 2A:
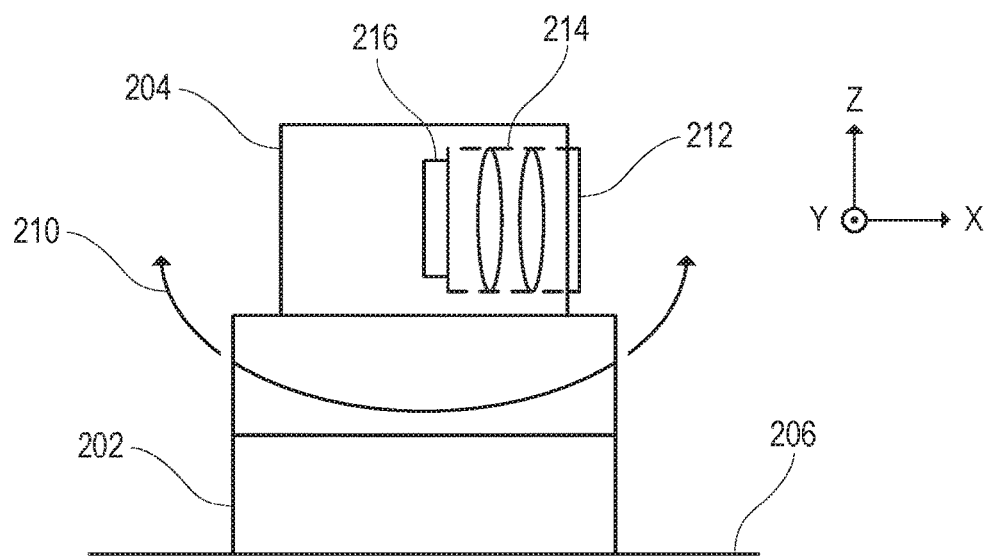

FIG. 2A illustrates an example tracking camera system 200, according to an embodiment of the present disclosure. In some embodiments, the tracking camera system 108 of FIG. 1 can be implemented as the tracking camera system 200 of FIG. 2A. A frontal view and a side view of the tracking camera system 200 are shown in FIG. 2A. The tracking camera system 200 can include a platform 202, and a camera module 204 mounted on the platform 202. As discussed, in some embodiments, the tracking camera system 200 can be mounted on or coupled to a roof 206 (or a top) of an autonomous vehicle. In general, the tracking camera system 200 can be configured to augment a LiDAR in identifying objects that are beyond a range or distance that the LiDAR can accurately identify the objects.

In some embodiments, the platform 202 can be configured to actuate or rotate in two orientations. For example, the platform 202 can be configured to rotate in an azimuth direction 208 and pivot in an elevation (or altitude) direction 210. In the azimuth direction 208, the platform 202 may rotate, about a center of the platform 202, from a left-side to a right-side of the platform 202, or vice versa. In this motion, the platform 202 rotates in-plane with a horizontal plane substantially parallel to the roof 206 of the autonomous vehicle (e.g., X-Y plane). In the elevation direction 210, the platform 202 may pivot from a bottom-side to a top-side of the platform 202, or vice versa. In this motion, the platform 202 moves in and out of the horizontal plane (e.g., the X-Y plane). In one embodiment, the platform 202 may have 360 degrees of rotational range or freedom in the azimuth direction 208 (e.g., rotating in circles). In another embodiment, rotations in the azimuth direction 208 may be restricted. For instance, the platform 202 may only rotate +/−90 degrees (for a total of 180 degrees of rotational range or freedom) from a frontal position (e.g., an arbitrary 0 degrees position). Similarly, in some embodiments, movements in the elevation direction 210 may be limited. For example, the platform 202 may pivot +/−30 degrees (for a total of 60 degrees of pivotal range or freedom) from the frontal position (e.g., the arbitrary 0 degrees position). In general, the platform 202 can be viewed as an articulable platform that can rotate in an X-Y plane of a Cartesian coordinate system (e.g., the azimuth direction 208) and pivot in an X-Z plane of the Cartesian coordinate system (e.g., the elevation direction 210).

The platform 202 may include at least two actuators. A first actuator to actuate a rotation in the azimuth direction 208 and a second actuator to actuate a pivot in the elevation direction 210. In general, the actuators can be any motor types that are capable of generating motion. Such motors types can include direct current motors, brushless direct current motors, switch reluctance motors, inductor motors, alternate current motors, synchronous motors, servo motors, or stepper motors, for example. In some embodiments, the motors may be coupled to one or more gears to control various rotations in the azimuth direction 208 and/or pivots in the elevation direction 210.

In some embodiments, the camera module 204 can be configured to capture image data. The image data can be used to augment a LiDAR in identifying distant objects. As discussed, a LiDAR's ability in identifying objects diminishes when the objects are beyond a threshold distance. In such instances, the camera module 204 can be configured to capture image data associated with the objects. This image data can be processed, using one or more object identification/recognition algorithms or machine learning techniques, to identify the objects in question. In some embodiments, the camera module 204 can include an aperture 212, an optical system 214, and an image sensor 216. The aperture 212 can include a shutter through which light entering the camera module 204 can be controlled. The shutter is a device that can vary an opening based on levels of light. For example, under bright light, the shutter may adapt to a small opening to limit light entering the camera module 204. In contrast, under low light, the shutter may adapt to a large opening to allow as much light entering the camera module 204 as possible.

In some embodiments, the optical system 214 can be configured to help the camera module 204 to focus on an object. The optical system 214 may utilize passive phase detection techniques to adjust a focus on the object as the object appears to the camera module 208. The optical system 214 measures a phase difference between the object and the camera module 208. This phase difference can be used by the optical system 214 to adjust the focus of the camera module 204 such that the object is in focus. For example, the optical system 214 determines the focus of the camera module 204 to be either front or back focused (e.g., the focus of the camera module 204 is either in front of or behind a plane of the image sensor 216). Based on this information (e.g., phase differences), the optical system 216 adjusts the focus of the camera module 204 such that the focus is on the plane of the image sensor 216.

The optical system 214 may comprise one or more lenses that collect, collimate, and converge incoming light onto the plane of the image sensor 216. In some embodiments, the optical system 214 comprises one or more actuators that are coupled to the one or more lenses. The one or more actuators can be configured to move the one or more lenses to adjust the focus of the camera module 204. The one or more actuators can include ultrasonic or piezoelectric motors, for example. In general, the optical system 214 works as a closed-loop control to maintain the focus of the camera module 204 on the object. For example, an object in view of the camera module 204 may move in and out of focus due to motions of either the object or an autonomous vehicle for which the camera module 204 is onboard. In this example, the optical system 214 measures real time phase differences between the object and the camera module 204 and continuously adjust the focus of the camera module 204 such that the object remains in focus to the camera module 204, independent of the motions. In some embodiments, the optical system 214 may have limited focal lengths (e.g., focus of the camera module 204). For example, the optical system 214 may have a focal length of anywhere from 10 millimeters (e.g., wide angle) to 700 millimeters (e.g., telephoto). For instance, the optical system 214 can be a telephoto lens system with focal lengths from 200 millimeters to 400 millimeters. In this instance, the telephoto lens system can maintain focus on an object within the focal lengths of 200 millimeters to 400 millimeters.

In some embodiments, the image sensor 216 can be utilized to capture image data. In one embodiment, the image sensor 216 may be a complementary metal oxide semiconductor (CMOS) type. In another embodiment, the image sensor 216 may be a charge-coupled device (CCD) type. In some cases, the image sensor 216 may include additional electronic circuitry to convert analog or light signals captured by the image sensor 216 to digital signals representing an image.

Figure 2B:
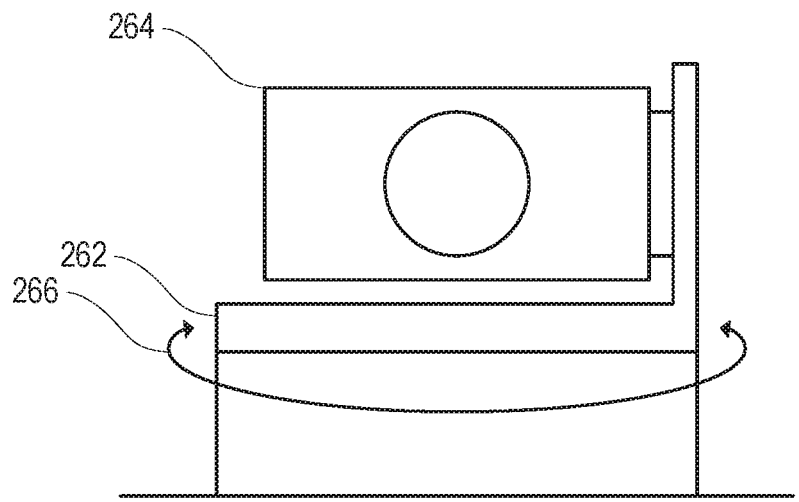
FIG. 2B illustrates another example tracking camera system, according to an embodiment of the present disclosure.
Figure 2B:
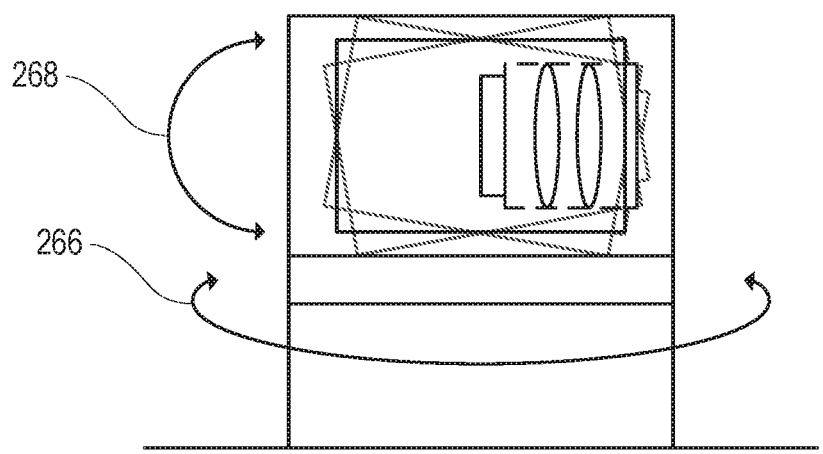

FIG. 2B illustrates another example tracking camera system 260, according to an embodiment of the present disclosure. In some embodiments, the tracking camera system 108 of FIG. 1 can be implemented as the tracking camera system 260 of FIG. 2B. As shown in FIG. 2B, the tracking camera system 260 can include a gimbal 262, and a camera module 264. In the example tracking camera system 260, the gimbal 262 is just another implementation of the platform 202 of FIG. 2A. The gimbal 262, similar to the platform 202, can rotate in an azimuth direction 266 and pivot in an elevation direction 268. The gimbal 262, similar to the platform 202, includes at least two actuators to actuate a rotation in the azimuth direction 266 and a pivot in the elevation direction 268. The camera module 264 works exactly same as the camera module 204 of FIG. 2A. In the example of FIG. 2B, the camera module 264 is depicted to be pivoting in the elevation direction 268.

As discussed, in various embodiments, a LiDAR can be utilized to survey an environment around an autonomous vehicle. The LiDAR does this by emitting thousands and thousands of pulsed laser lights to the environment and measuring reflected pulsed laser lights from objects in the environment. Distances between the LiDAR and the objects can be determined based on the time pulsed laser lights are emitted from the LiDAR and to the time the pulsed laser lights, reflected off from the objects, are received by the LiDAR. These measured distances (e.g., data points in point cloud data) can be utilized to spatially map out contours of the objects. For example, in an embodiment, the LiDAR may comprise a plurality of pulsed laser lights (e.g., channels) arranged vertically in a line perpendicular to a ground. The plurality of pulsed laser lights can be continuously rotated to acquire data points (e.g., point cloud data) of an environment. As the plurality of pulsed laser lights sweeps through the environment, surface details (or contours) of objects in the environment can be captured with pulsed laser lights. For instance, pulsed laser lights reflected off from a flat surface is distinguishable from pulsed laser lights reflected off from a spherical surface based on distances traveled by the pulsed laser lights as measured by the LiDAR. In this instance, the pulsed laser lights reflected off from the flat surface have same relative distances to the LiDAR, while the pulsed laser lights reflected off from the spherical surface have varying relative distances to the LiDAR. In various embodiments, the contours of the objects can be used to identify the objects in the environment. For example, a contour of a pedestrian is different than that of a cyclist. Thus, by processing the point cloud data gathered from the LiDAR, the objects in the environment can be identified and differentiated.

In various embodiments, a LiDAR's ability to identify objects (e.g., contours of objects) in an environment decreases as distances between the LiDAR and the objects are increased or the distances become more distant. For example, there can be a first object at a first distance away from a LiDAR of an autonomous vehicle and a second object at a second distance away from the LiDAR of the autonomous vehicle. Further, the second object is further away from the autonomous vehicle than the first object (e.g., the second distance is longer than the first distance). In this example, as the LiDAR scans the environment with pulsed laser lights, more pulsed laser lights would reflect off from the first object than the second object. This is due to the fact that the first object is closer to the LiDAR than the second object (e.g., an arc length corresponding to successive pulsed laser lights at the first distance is shorter than an arc length corresponding to the successive pulsed laser lights at the second distance). In other words, as pulsed laser lights travel further and further out in distance, there is more and more spacing (e.g., arc length) between successive pulsed laser lights. Thus, if the first object and the second object are same, more pulsed laser lights would reflect off from the first object than the second object for a given rotation. Therefore, in this example, the LiDAR is able to "see" a contour of the first object more so than a contour of the second object. As such, the LiDAR's ability to identify objects diminishes as distances are increased. Under such circumstances, a tracking camera system can be utilized to augment the LiDAR in identifying objects that are afar.

Figure 3:
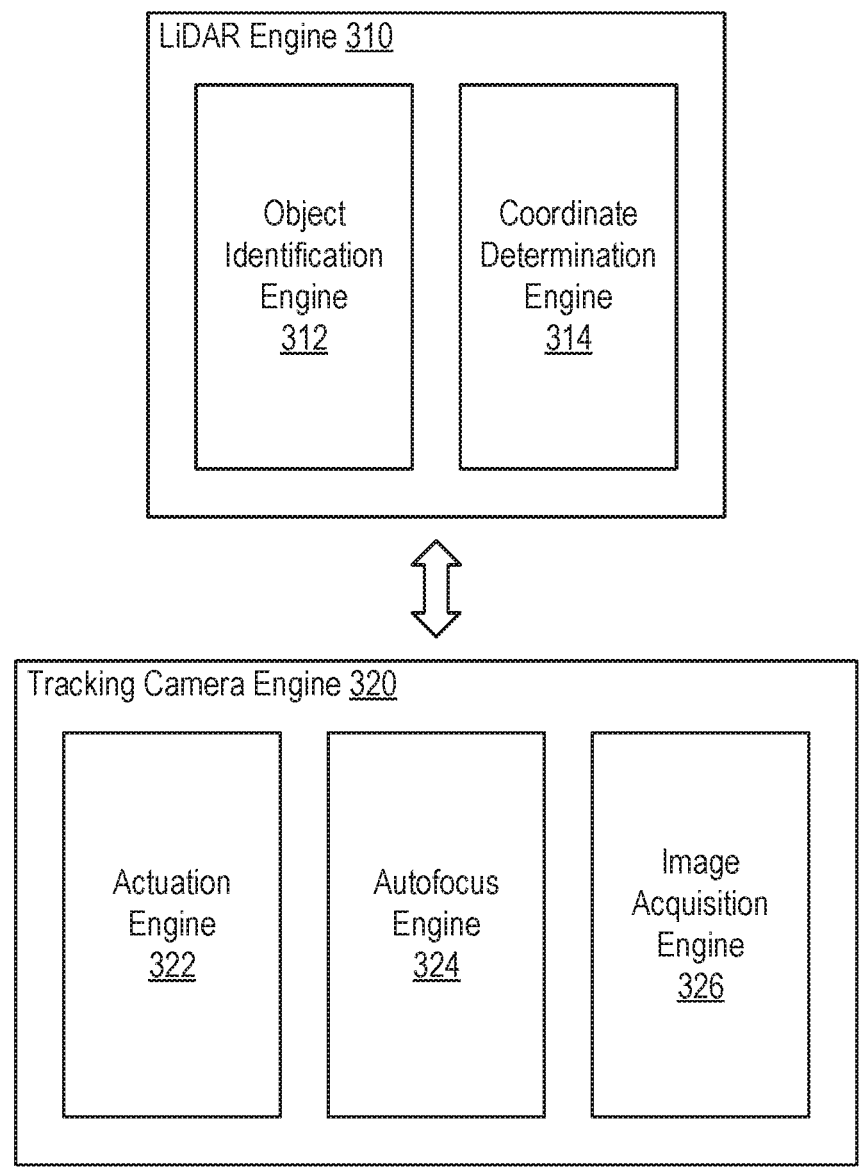
FIG. 3 illustrates an example system for implementing a tracking camera system onboard an autonomous vehicle, according to an embodiment of the present disclosure.

Now referring to FIG. 3. FIG. 3 illustrates an example system 300 for implementing a tracking camera system onboard an autonomous vehicle, according to an embodiment of the present disclosure. As shown in FIG. 3, the example system 300 can include a LiDAR engine 310 and a tracking camera engine 320. The LiDAR engine 310 can further include an object identification engine 312 and a coordinate determination engine 314. The tracking camera engine 320 can further include an actuation engine 322, an autofocus engine 324, and an image acquisition engine 326. In some embodiments, the LiDAR engine 310 can be implemented with hardware, software, and/or firmware that reside in a LiDAR (e.g., the LiDAR 102 of FIG. 1) and/or one or more computing systems onboard the autonomous vehicle. The tracking camera engine 320 can be implemented with hardware, software, and/or firmware that reside in a tracking camera system (e.g., the tracking camera system 108 of FIG. 1) and/or the one or more computing systems onboard the autonomous vehicle. In this example system 300, the LiDAR engine 310 is operatively coupled to the tracking camera engine 320. For instance, the LiDAR engine 310 and the tracking camera engine 320 can be configured to communicate with one another. This communication can include, but not limited to, data from the coordinate determination engine 314 and the image acquisition engine 326. In various embodiments, the communication between the LiDAR engine 310 and the tracking camera engine 320 can be implemented in a number of different ways. For example, the communication can be implemented using wired or wireless communication links and protocols. Many variations are possible.

In some embodiments, the object identification engine 312 can be configured to identify objects based on data (e.g., point cloud data) acquired from the LiDAR. The data from the LiDAR can be used by the object identification engine 312 to determine contours of the objects. The contours of the objects can be used for identifying the objects. For example, based on the contours, the object identification engine 312 can distinguish a pedestrian from a cyclist and from a vehicle. In general, identifying objects can involve object identification/recognition algorithms and/or machine learning techniques. The object identification engine 312, based on the object identification/recognition algorithms and/or the machine learning techniques, can output a confidence score associated with each object that the object identification engine 312 identifies based on the point cloud data. The confidence score can be an indication of a confidence level of the object identification engine 312 in identifying the objects. For instance, on a scale of 1 to 100, a confidence score of 90 indicates that the object identification engine 312 has "high" confidence in its identification of the objects. A confidence score of 10, meanwhile, indicates the object identification engine 312 has "low" confidence in its identification of the objects. For example, while scanning an environment, only four pulsed laser lights (e.g., data points in the point cloud data) are reflected off from an object. The object identification engine 312 constructs a contour of the object, based on the four pulsed lights (or data points), to be some sort of a two dimensional plane. The object identification engine 312 identifies, using the object identification/recognition algorithms and/or the machine learning techniques, that the object in question is a road sign and assigns this identification a confidence score of 10. In this example, the object identification engine 312 is not "confident" in its suggestion that the object identified is a road sign. In contrast, if eighty pulsed laser lights are reflected off from the object, the object identification engine 312 is able to construct a more detailed contour of the object, and therefore, may suggest an identification with a higher confidence score. As such, in general, the more data points collected from an object (e.g., pulsed laser light reflected off from an object), the more accurate the identification process becomes.

In some embodiments, the coordinate determination engine 314 can be configured to determine an object's coordinates in an environment. The coordinate determination engine 314 can estimate an azimuth angle of the object based on pulsed laser lights reflected off from the object and a rotation of the LiDAR. The coordinate determination engine 314 can estimate an elevation angle of the object based on pulsed laser lights reflected off from the object. In some embodiments, the coordinate determination engine 314 can express the object's coordinates in Cartesian coordinates (e.g., x-y-z coordinates) instead of spherical coordinates (e.g., azimuth and elevation).

The coordinate determination engine 314, in some embodiments, can work concurrently with the object identification engine 312. For example, when a confidence score corresponding to an object is below some threshold confidence score as identified by the object identification engine 312, the coordinate determination engine 314 can determine coordinates of the object. This coordinate data can be communicated to the tracking camera engine 320 so a tracking camera system (e.g., the tracking camera system 200 of FIG. 2A) can be utilized to augment the LiDAR in identifying the object in question.

In some embodiments, the actuation engine 322 can be configured to receive coordinate data from the coordinate determination engine 314 and to actuate a platform of the tracking camera system (e.g., the platform 202 of FIG. 2A) to point or orient a camera mounted on the platform (e.g., the camera module 204 of FIG. 2A) to a position such that the object in question is in view of the camera. The actuation engine 322 can actuate the platform to an azimuth position and an elevation position in response to the coordinate data received. In some embodiments, the actuation engine 322 can compensate for motion. The actuation engine 322 can receive vehicle operation data from the autonomous vehicle. The vehicle operation data can include speed, direction, throttle percentage, brake percentage, steering rotation, trajectory planning, and obstacle perception, for example. Based on the vehicle operation data, the actuation engine 322 can adjust or fine tune the position of the platform such that the camera remains pointed or oriented to the direction where the object in question is in view. For example, while the tracking camera system points to the object in question, either the object in question or the autonomous vehicle for which the tracking camera system is onboard, or both, moves. In this example, the actuation engine 322 can maintain pointing to the object in question while accounting for motions or movements of the object in question and/or autonomous vehicle simultaneously so that the object in question remains in view of the camera.

In some embodiments, the autofocus engine 324 can be configured to bring a focus of the object in question to the camera of the tracking camera system. The autofocus engine 324 utilizes a telephoto lens system (e.g., the optical system 214 of FIG. 2A) to bring about the focus of the object in question in focus. The autofocus engine 324 can continuously determine the focus of the camera and continuously adjust the telephoto lens system such that the object in question remains in focus. In some embodiments, the autofocus engine 324, like the actuation engine 322, can receive vehicle operation data from the autonomous vehicle and adjust the focus of the camera preemptively.

In some embodiments, the image acquisition system engine 326 can be configured to capture images of the object in question. Once the actuation engine 322 points the camera in the right direction and the autofocus engine 324 focuses the object in question, the image acquisition system 326 can capture image data associated with the object in question. The image acquisition system 326 can process the captured image data, using various object identification/recognition algorithms and/or machine learning techniques, to identify the object in question. Based on this identification, the image acquisition system 326 can output a confidence score. This confidence score can be used in conjunction or in lieu of the confidence score generated by the object identification engine 312. In some embodiments, the confidence score outputted by the image acquisition engine 326 can override the confidence score generated the object identification engine 326.

Figure 4:
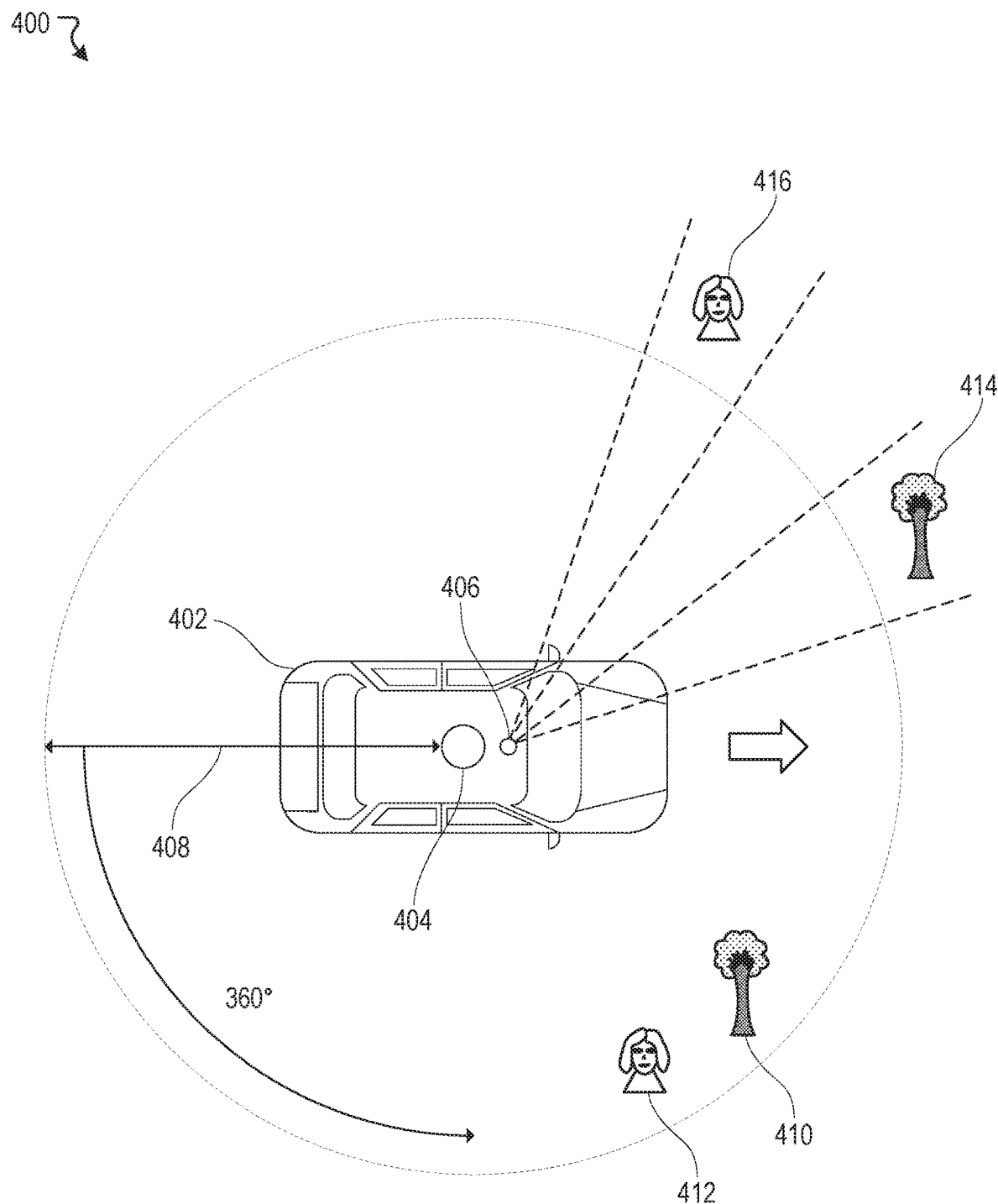
FIG. 4 illustrates an example scenario for implementing a tracking camera system onboard an autonomous vehicle, according to an embodiment of the present disclosure.

FIG. 4 illustrates an example scenario 400 for implementing a tracking camera system onboard an autonomous vehicle, according to an embodiments of the present disclosure. In this example scenario 400, an autonomous vehicle 402 is shown driving in a forward direction. The autonomous vehicle 402 has a LiDAR 404 and a tracking camera system 406 mounted to a roof of the autonomous vehicle 402. The LiDAR 404 can be utilized by the autonomous vehicle 402 to detect, identify, and track objects in an environment. In general, the LiDAR's ability to accurately identify objects can be limited by distances of the objects to the LiDAR 404. In this example, there is a threshold distance 408 for which any objects within a radius of the threshold distance 408, the LiDAR 404 is able to accurately identify the objects. Any objects outside of the radius, the LiDAR's ability to identify the objects diminishes. For instance, in this example, there can be a first tree 410 and a first person 412. Both the first tree 410 and the first person 412 are within the radius of the threshold distance 408. As such, the LiDAR 404 can accurately detect, identify, and track the first tree 410 and the first person 412 based on their contours (e.g., confidence scores associated with the first tree 410 and the first person 412 are high). The autonomous vehicle 402 can utilize this information to navigate round the environment. Further, in this example, there can be a second tree 414 and a second person 416. Here, both the second tree 414 and the second person 416 are outside the radius of the threshold distance 408. As such, although the LiDAR 404 is able to detect and track the second tree 414 and the second person 416, the LiDAR's ability to identify the second tree 414 as a tree and the second person 416 as a person is diminished (e.g., confidence scores associated with the second tree 414 and the second person 416 are below a threshold confidence score). In such cases, the tracking camera system 406 can augment the LiDAR 404 in identifying the second tree 414 and the second person 416.

The tracking camera system 406 may receive coordinate data from the LiDAR 404 and/or the autonomous vehicle 402 corresponding to the second tree 414 and the second person 416. Based on the coordinate data corresponding to the second tree 414, the tracking camera system 406 actuates to a position such that the second tree 414 is in view of the tracking camera 406. The tracking camera 406 automatically focuses on the second tree 414, acquires image data associated with the second tree 414, and identifies the second tree 414 as a tree with a confidence score. Further, in this example, the tracking camera system 406 actuates itself to another position such that the second person 416 is in view of the tracking camera 406. The tracking camera system 408 actuates to the another position based on the coordinate data corresponding to the second person 416. Similarly, here, the tracking camera 406 automatically focuses on the second person 416, acquires image data associated with the second person 416, and identify the second person 416 as a person with a confidence score. The autonomous vehicle 402 can utilize this information to navigate round the environment and in anticipation of the second tree 414 and the second person 416.

Figure 5:
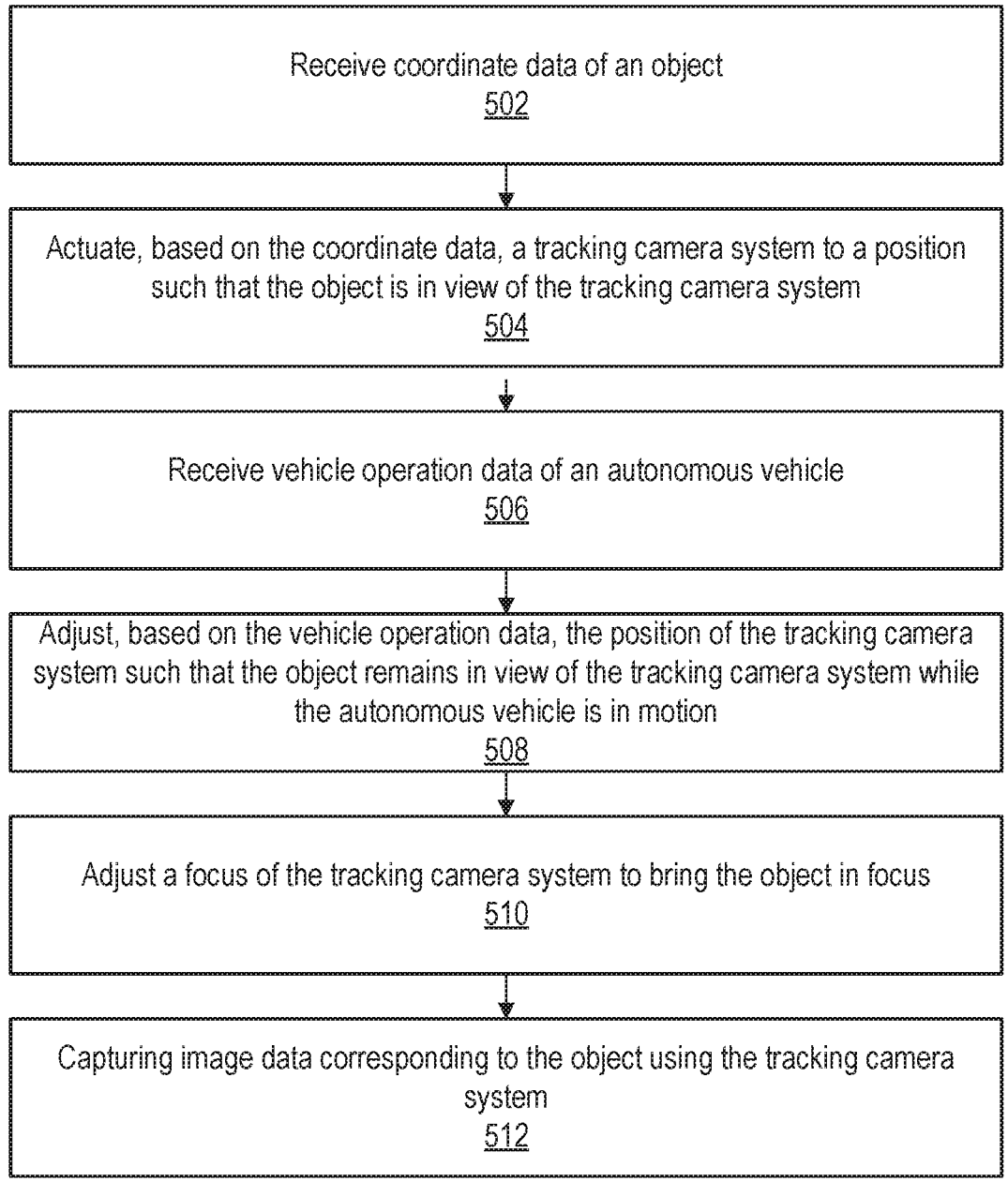
FIG. 5 illustrates an example method, according to an embodiment of the present disclosure.

FIG. 5 illustrates an example method 500, according to an embodiment of the present disclosure. The method 500 may be implemented in various environments including, for example, the example system 300 of FIG. 3. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, coordinate data of an object are received. At block 504, a tracking camera system actuates, based on the coordinate data, to a position such that the object is in view of the tracking camera system. At block 506, vehicle operation data of an autonomous vehicle are received. At block 508, the position of the tracking camera system is adjusted, based on vehicle operation data, such that the object remains in view of the tracking camera system while the autonomous vehicle is in motion. At block 510, a focus of the tracking camera system is adjusted to bring the object in focus. At block 512, the tracking camera system captures image data corresponding to the object.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
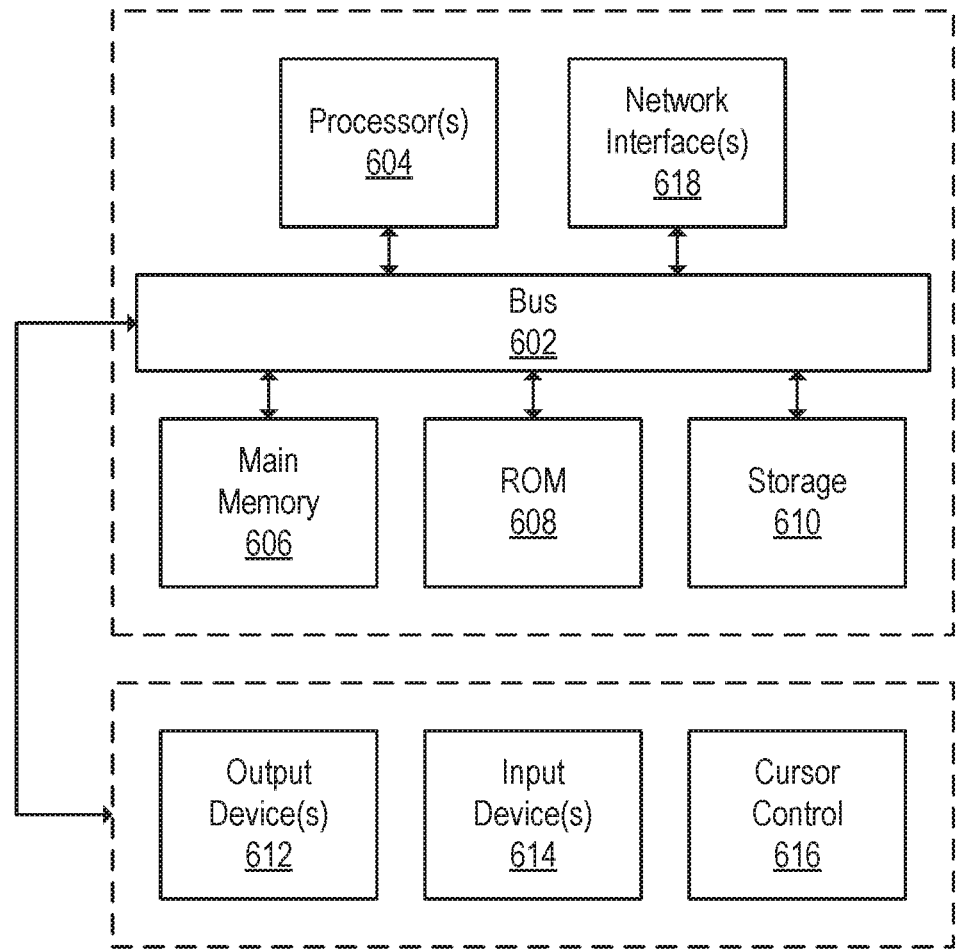
FIG. 6 illustrates a block diagram of a computer system.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method for implementing a tracking camera system onboard an autonomous vehicle comprising:

obtaining, by a computing system, point cloud data of an environment from a light detection and ranging (LiDAR) sensor of the autonomous vehicle;

determining, by the computing system, based on the point cloud data, that a confidence score of an object in the environment is below a threshold score, the confidence score indicating that the object is beyond a threshold identification distance of the LiDAR sensor;

in response to determining that the confidence score of the object is below the threshold score, receiving, by the computing system, coordinate data of the object from the LiDAR sensor, wherein the coordinate data is determined based on pulsed laser lights of the LiDAR sensor reflected off from the object and a rotation of the LiDAR sensor;

actuating, by the computing system, based on the coordinate data, the tracking camera system to a position such that the object is in view of the tracking camera system;

receiving, by the computing system, vehicle operation data of the autonomous vehicle;

adjusting, by the computing system, based on the vehicle operation data, the position of the tracking camera system such that the object remains in view of the tracking camera system while the autonomous vehicle is in motion;

adjusting, by the computing system, a focus of the tracking camera system to bring the object in focus; and capturing, by the computing system, image data corresponding to the object using the tracking camera system.

2. The computer-implemented method of claim 1, further comprising:

analyzing the image data, based on one or more object identification and recognition techniques, to identify the object; and determining a confidence score associated with the identified object.

3. The computer-implemented method of claim 1, wherein adjusting the focus of the tracking camera system to bring the object in focus comprises:

determining a phase difference between the object and the tracking camera system; and actuating, based on the phase difference, one or more lenses in an optical system of the tracking camera to bring the object in focus.

4. The computer-implemented method of claim 1, wherein the vehicle operation data comprises at least a vehicle speed and a vehicle direction of the autonomous vehicle.

5. The computer-implemented method of claim 4, wherein adjusting the position of the tracking camera system such that the object remains in view of the tracking camera system comprises:

rotating the tracking camera system, continuously, in an azimuth direction, to account for the vehicle speed and the vehicle direction; and pivoting the tracking camera system, continuously, in an elevation direction, to account for the vehicle speed and the vehicle direction.

6. The computer-implemented method of claim 1, wherein the coordinate data comprises azimuth data and elevation data corresponding to a location of the object.

7. The computer-implemented method of claim 6, wherein the azimuth data corresponding to the location of the object is determined based on the rotation and point cloud data of the LiDAR sensor.

8. The computer-implemented method of claim 6, wherein the elevation data corresponding to the location of the object is determined based on point cloud data of the LiDAR sensor.

9. The computer-implemented method of claim 6, wherein actuating the tracking camera system to the position such that the object is in view of the tracking camera comprises:

rotating the tracking camera system to an azimuth position corresponding to the azimuth data; and pivoting the tracking camera system to an elevation position corresponding to the elevation data.

10. A computing system for implementing a tracking camera system onboard an autonomous vehicle comprising:
one or more processors; and
a memory storing instructions that, when executed by the one or more processor, causes the computing system to perform:
obtaining point cloud data of an environment from a light detection and ranging (LiDAR) sensor of the autonomous vehicle;
determining, based on the point cloud data, that a confidence score of an object in the environment is below a threshold score, the confidence score indicating that the object is beyond a threshold identification distance of the LiDAR sensor;
receiving coordinate data of the object from the LiDAR sensor, wherein the coordinate data is determined based on pulsed laser lights of the LiDAR sensor reflected off from the object and a rotation of the LiDAR sensor;
actuating, based on the coordinate data, the tracking camera system to a position such that the object is in view of the tracking camera system;
receiving vehicle operation data of the autonomous vehicle;
adjusting, based on the vehicle operation data, the position of the tracking camera system such that the object remains in view of the tracking camera system while the autonomous vehicle is in motion;
adjusting a focus of the tracking camera system to bring the object in focus; and
capturing image data corresponding to the object using the tracking camera system.

11. The computing system of claim 10, wherein the memory storing instructions causes the system to further perform:
analyzing the image data, based on one or more object identification and recognition techniques, to identify the object; and
determining a confidence score associated with the identified object.

12. The computing system of claim 10, wherein actuating the tracking camera system to the position such that the object is in view of the tracking camera comprises:
rotating the tracking camera system to an azimuth position corresponding to azimuth data of the coordinate data; and
pivoting the tracking camera system to an elevation position corresponding to elevation data of the coordinate data.

13. The computing system of claim 10, wherein adjusting the position of the tracking camera system such that the object remains in view of the tracking camera system comprises:
rotating the tracking camera system, continuously, in an azimuth direction, to account for a vehicle speed and a vehicle direction of the autonomous vehicle; and
pivoting the tracking camera system, continuously, in an elevation direction, to account for the vehicle speed and the vehicle direction of the autonomous vehicle.

14. A non-transitory computer readable medium comprising instructions that, when executed, cause one or more processors of a tracking camera system onboard an autonomous vehicle to perform:
obtaining point cloud data of an environment from a light detection and ranging (LiDAR) sensor of the autonomous vehicle;
determining, based on the point cloud data, that a confidence score of an object in the environment is below a threshold score, the confidence score indicating that the object is beyond a threshold identification distance of the LiDAR sensor;
receiving coordinate data of an object, wherein the coordinate data is determined based on pulsed laser lights of a light detection and ranging (LiDAR) sensor reflected off from the object and a rotation of the LiDAR sensor;
actuating, based on the coordinate data, the tracking camera system to a position such that the object is in view of the tracking camera system;
receiving vehicle operation data of the autonomous vehicle;
adjusting, based on the vehicle operation data, the position of the tracking camera system such that the object remains in view of the tracking camera system while the autonomous vehicle is in motion;
adjusting a focus of the tracking camera system to bring the object in focus; and
capturing image data corresponding to the object using the tracking camera system.

15. The non-transitory computer readable medium of claim 14, wherein the instructions, when executed, causes the one or more processors of the tracking camera system to further perform:
analyzing the image data, based on one or more object identification and recognition techniques, to identify the object; and
determining a confidence score associated with the identified object.

16. The non-transitory computer readable medium of claim 14, wherein the coordinate data comprises azimuth data and elevation data corresponding to a location of the object.

17. The non-transitory computer readable medium of claim 16, wherein the azimuth data corresponding to the location of the object is determined based on the rotation and point cloud data of the LiDAR sensor.

18. The non-transitory computer readable medium of claim 16, wherein actuating the tracking camera system to the position such that the object is in view of the tracking camera comprises:
rotating the tracking camera system to an azimuth position corresponding to the azimuth data; and
pivoting the tracking camera system to an elevation position corresponding to the elevation data.

19. The non-transitory computer readable medium of claim 14, wherein the vehicle operation data comprises at least a vehicle speed and a vehicle direction of the autonomous vehicle.

20. The non-transitory computer readable medium of claim 19, wherein adjusting the position of the tracking camera system such that the object remains in view of the tracking camera system comprises:
rotating the tracking camera system, continuously, in an azimuth direction, to account for the vehicle speed and the vehicle direction; and
pivoting the tracking camera system, continuously, in an elevation direction, to account for the vehicle speed and the vehicle direction.

* * * * *